Jan. 3, 1928.

M. MURPHY 1,655,192

PLATE ADJUSTMENT FOR TOASTERS

Filed May 9, 1927

INVENTOR,
Morton Murphy,
By Minturn & Minturn,
Attorneys.

Patented Jan. 3, 1928.

1,655,192

UNITED STATES PATENT OFFICE.

MORTON MURPHY, OF RUSHVILLE, INDIANA.

PLATE ADJUSTMENT FOR TOASTERS.

Application filed May 9, 1927. Serial No. 189,780.

This invention relates to a toasting device of the type having two opposed heated plates or elements, between which the product to be toasted is placed, and it relates in particular to the means for adjustably positioning one of the plates in relation to the other to accommodate products of different thickness as well as to vary the pressure exerted on the products, such as sandwiches.

The invention is described in reference to the accompanying drawing, in which—

Figure 1:
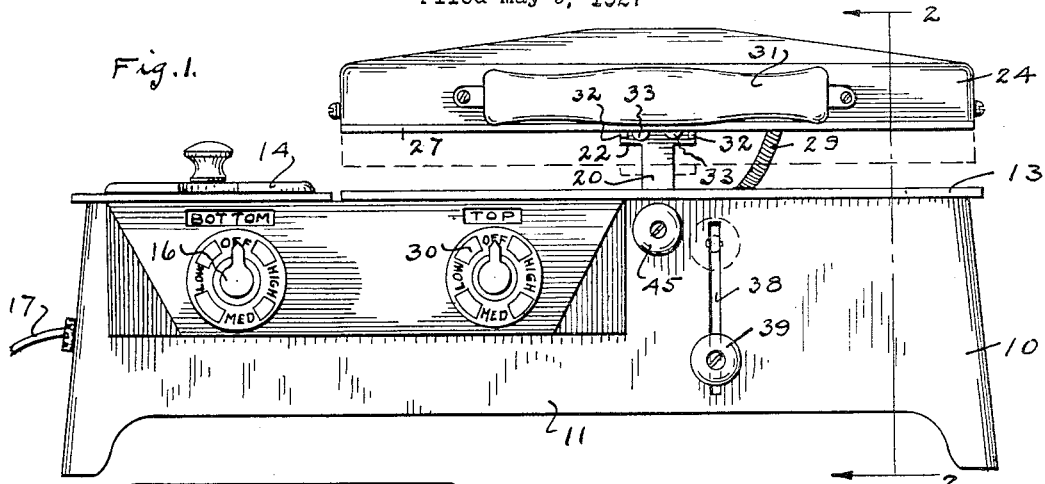
Figure 4:
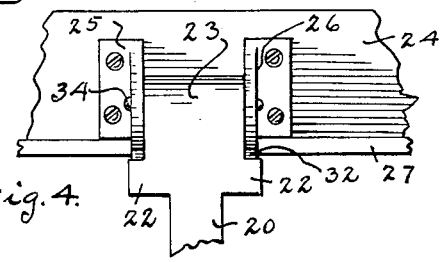
Figure 2:
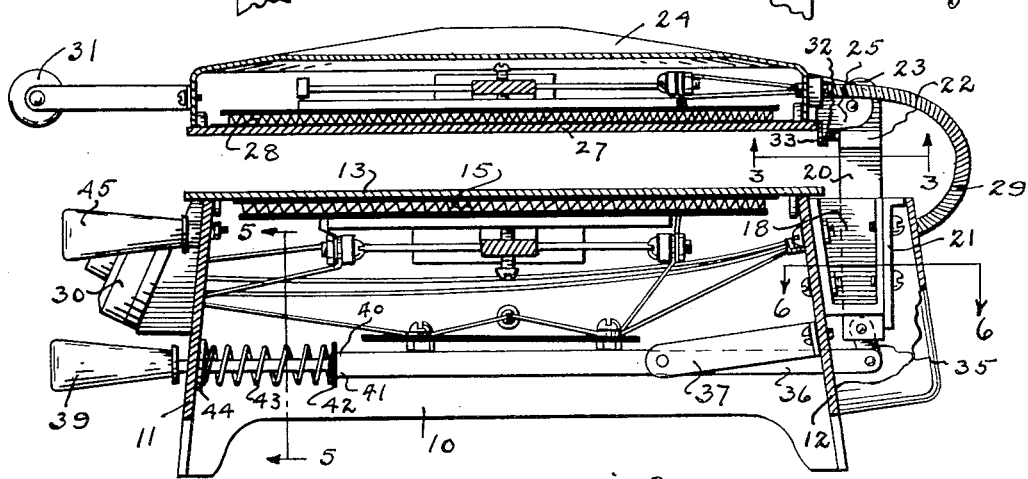
Figure 5:
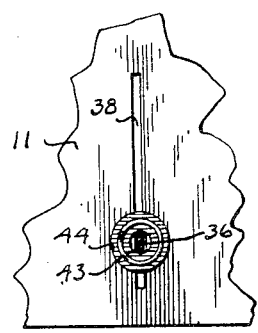

Fig. 1, is a front elevation of a toaster;

Fig. 2, a transverse vertical section through the toaster on the line 2—2 in Fig. 1;

Fig. 3, a transverse horizontal section through the upper plate supporting standard;

Fig. 4, a detail in rear elevation of the hinged connection of the upper plate with its supporting standard;

Fig. 5, a vertical section on the line 5—5 in Fig. 2; and

Figure 6:
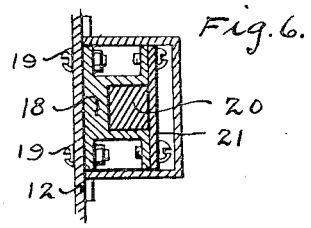

Fig. 6, a horizontal section on the line 6—6 in Fig. 2.

Like characters of reference indicate like parts throughout the several views.

The toaster herein shown and described is of the type especially adapted to toast sandwiches, though it will very satisfactorily toast sliced bread and the like, and is built with a housing 10 having the front wall 11 and rear wall 12 interconnecting the end walls. The housing 11 is open from below and has the surface plate 13 forming the upper closure together with the butter receptacle plate 14.

Below the plate 13 is mounted the electrical heating element 15 in electrical circuit with the control switch 16 and the current supply cable 17, whereby the plate 13 may be heated as desired.

A guide 18 is secured to the rear wall 12 (Figs. 1 and 6) by the bolts 19, and carries therethrough the square standard 20 so that the standard 20 may be reciprocated vertically in the guide 18. A rear cover plate 21 retains the standard 20 in the guide 18.

The upper end of the standard 20 is T-shaped with the two lateral projections 22 and carries the head 23 to which the upper plate housing 24 is hinged through the hinge plates 25 and 26. The upper plate housing carries the upper plate 27 which may be heated by the electrical element 28 immediately thereabove and in electrical circuit through the cable 29, with the switch 30 and the supply cable 17.

A handle 31 is secured to the front of the upper plate housing 24 to enable the plate 27 to be swung upwardly and away from the lower plate 13 about the standard head 23 as above indicated. A stop 32 may be provided on each of the hinge plates 25 and 26 to contact the projections 22 when the plate 27 is lowered to limit the swing of the plate 27 toward the plate 13, but such means for limiting the travel do not meet the requirements under all conditions.

In order to obtain uniform toasting or browning of the bread it is highly desirable that the plates 13 and 27 be held in parallel alignment, and to secure such parallel alignment in quantity production of the toasters during which variations in location of the stops 32 will invariably creep in, two adjusting screws 33 are screw-threadedly engaged in the standard 20 from its front face, so located that the rear edge of the plate 27 will strike them when the plate is lowered, as in Figs. 1, 2, and 3. By suitably turning these screws 33, the plate 27 may be supported in cooperation with the hinge pin 34, parallel to the plate 13. Any wear on the pin 34 or the hinge plates 25 and 26 may be compensated for by adjusting these screws 33 to maintain the parallel relationship.

Now as sandwiches will vary in thickness, and as it may be desired to employ the toaster to toast slices of bread in single thickness, the upper plate 27 is adapted to be raised and lowered in reference to the plate 13, with the plate 27 maintaining its parallelism to the plate 13 during the change in elevation.

To accomplish such adjustment, the lower end of the standard 20 carries the connecting link 35 pivotally secured by its other end to the rear end of the lever 36, which lever 36 extends through the rear wall 12 of the housing 10 to be pivotally carried by the bracket 37 within the housing, and to extend on across the housing 10 to pass out through the vertical slot 38 in the front wall 11 and carry the handle 39 by its forward end.

For a distance back of the front wall 11, the lever 36 is reduced in height leaving the shoulders 40 and 41 against which is pressed a washer or plate 42 by a compression spring 43 surrounding the reduced section and pressing by its forward end the washer or friction plate 44 against the inside surface of the front housing wall 11.

By raising the handle 39, the lever 36 is rocked on the bracket 37 to cause the standard 20 to be pulled down, which action will carry the plate 27 downwardly toward the plate 13, as indicated by the dash lines in Fig. 1. Similarly, by lowering the handle 39, the plate 27 is raised. In either case, the plate 27 is always parallel to the plate 13, as determined by the screws 33, though at any position throughout the range of vertical travel, the plate 27 may be swung up from the plate 13, about its hinged connection with the standard 20.

The desired elevation of the plate 27 is maintained after operating the lever 39, by the frictional resistance of the washer 44 to movement over the face of the wall 11. A stationary handle 45 is secured to the front face of the front wall 11 as an aid in bringing the plate 27 down toward the plate 13. By gripping both the handle 45 and the handle 39 by one hand and squeezing, the lower handle 39 is easily pulled up to obtain the desired pressure on the object being toasted between the plates.

I claim:

1. In an electric toaster, two opposed heating units, one of said units being hinged to permit it being swung away from the other, adjustable means limiting the swinging travel of said swinging unit toward the other unit, and means for varying the elevation of said swinging unit above said other unit.

2. In an electric toaster, a heating unit, a standard, a second unit hinged to said standard and adapted to be swung over said first unit, and means for raising and lowering said standard, and adjustable stops between said standard and said second heating unit limiting the swinging of the second unit toward the first unit.

3. In an electric toaster, a housing, a heating unit carried by the housing, a standard slidingly carried by the housing, a second heating unit hinged to the standard whereby it may be swung to be positioned over the first heating unit, a lever associated with the standard adapted to raise and lower the standard, a shoe carried by said lever, and spring means for yieldingly compressing said shoe against said housing whereby said shoe frictionally resists movement of the lever.

4. In an electric toaster, a housing, a heating unit carried by the housing, a standard slidingly carried by the housing, a second heating unit hinged to the standard whereby it may be swung to be positioned over the first heating unit, a lever associated with the standard adapted to raise and lower the standard, and frictional means cooperating between the lever and the housing opposing the travel of the standard, and stops adjustably carried by the standard limiting the swinging of said second unit toward said first unit.

In testimony whereof I affix my signature.

MORTON MURPHY.